(12) United States Patent
Hirai et al.

(10) Patent No.: US 11,528,383 B2
(45) Date of Patent: Dec. 13, 2022

(54) LIQUID JET DEVICE AND BILLING METHOD THEREOF

(71) Applicant: SEIKO EPSON CORPORATION, Tokyo (JP)

(72) Inventors: Yasuaki Hirai, Shiojiri (JP); Takashi Akase, Azumino (JP); Kenji Tsukada, Shiojiri (JP); Masato Haga, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/332,137

(22) Filed: May 27, 2021

(65) Prior Publication Data

US 2021/0385351 A1    Dec. 9, 2021

(30) Foreign Application Priority Data

Jun. 3, 2020 (JP) .............................. JP2020-096893

(51) Int. Cl.
     *H04N 1/34*      (2006.01)
     *G06F 3/12*      (2006.01)
     *G06K 15/10*      (2006.01)

(52) U.S. Cl.
     CPC ........... *H04N 1/346* (2013.01); *G06F 3/1239* (2013.01); *G06K 15/102* (2013.01)

(58) Field of Classification Search
None
See application file for complete search history.

(56) References Cited

U.S. PATENT DOCUMENTS

| | | | |
|---|---|---|---|
| 2002/0073002 A1 | 6/2002 | Horii et al. | |
| 2003/0115156 A1* | 6/2003 | Baker | G07F 17/0014 |
| | | | 705/400 |
| 2017/0015105 A1 | 1/2017 | Kuwahara et al. | |

FOREIGN PATENT DOCUMENTS

| | | | | |
|---|---|---|---|---|
| CN | 102848724 A | * | 1/2013 | |
| JP | 2002036582 A | | 2/2002 | |
| JP | 2004145444 A | | 5/2004 | |
| JP | 2008033565 | * | 2/2008 | |
| JP | 2017027188 A | | 2/2017 | |
| JP | 2021130259 | * | 9/2021 | |

* cited by examiner

*Primary Examiner* — Fan Zhang
(74) *Attorney, Agent, or Firm* — Chip Law Group

(57) ABSTRACT

A billing method for a liquid jet device includes, counting a consumed amount of liquid by printing, counting the number of printed sheets, counting a consumed amount of liquid for maintenance of a jet head, calculating a maintenance consumption amount per unit number of sheets, from a maintenance consumption amount consumed in current maintenance, and the number of printed sheets for which printing is performed from previous maintenance to the current maintenance, setting, as a liquid consumption amount, a value obtained by adding the maintenance consumption amount per unit number of sheets, to a print consumption amount consumed in printing for the unit number of sheets, and billing for printing for the same number of sheets as the number of printed sheets performed after the current maintenance, in accordance with the liquid consumption amount.

10 Claims, 9 Drawing Sheets

LIQUID JET DEVICE AND BILLING METHOD THEREOF

The present application is based on, and claims priority from JP Application Serial Number 2020-096893, filed Jun. 3, 2020, the disclosure of which is hereby incorporated by reference herein in its entirety.

BACKGROUND

1. Technical Field

The present disclosure relates to a liquid jet device and a billing method thereof, for example.

2. Related Art

JP 2002-36582 A describes a liquid jet device that performs printing by jetting liquid on a medium. The liquid jet device performs billing in accordance with a consumed amount of liquid consumed. A user pays, for example, for every month, a billed amount corresponding to a consumed amount.

Such a liquid jet device may forcibly cause liquid to be discharged from a liquid jet head, as maintenance of the liquid jet head. A consumed amount of liquid consumed in maintenance is very high compared to a consumed amount of liquid consumed in printing. Thus, for example, in a month where maintenance is performed, a consumed amount of liquid is greatly increased as compared to a month where maintenance is not performed. That is, there is a possibility that a billed amount for a month where maintenance is performed increases greatly compared to a billed amount for a month where maintenance is not performed.

SUMMARY

A billing method for a liquid jet device that solves the above-described problems includes, counting a consumed amount of liquid jetted from a liquid jet head for printing on a medium, counting the number of sheets of the medium on which printing was performed, counting a consumed amount of liquid forcibly discharged from the liquid jet head for maintenance of the liquid jet head, calculating a maintenance consumption amount per unit number of sheets from a maintenance consumption amount that is a consumed amount of liquid consumed in current maintenance, and the number of printed sheets that is the number of sheets of the medium on which printing was performed from previous maintenance to the current maintenance, setting, as a liquid consumption amount, a value obtained by adding the maintenance consumption amount per unit number of sheets, to a print consumption amount that is a consumed amount of liquid consumed in printing for the unit number of sheets, and performing billing for printing on the same number of sheets as the number of printed sheets performed after the current maintenance, in accordance with the liquid consumption amount.

A liquid jet device that solves the above-described problems includes, a liquid jet head configured to jet liquid on a medium for printing on the medium, a maintenance mechanism configured to forcibly cause liquid to be discharged from the liquid jet head to maintain the liquid jet head, and a control unit, wherein the control unit counts a consumed amount of liquid jetted from the liquid jet head for printing on the medium, counts the number of sheets of the medium on which printing was performed, counts a consumed amount of liquid forcibly discharged from the liquid jet head, for maintenance of the liquid jet head, calculates a maintenance consumption amount per unit number of sheets, from a maintenance consumption amount that is a consumed amount of liquid consumed in current maintenance, and the number of printed sheets that is the number of sheets of the medium on which printing was performed from previous maintenance to the current maintenance, sets as a liquid consumption amount, a value obtained by adding the maintenance consumption amount per unit number of sheets, to a print consumption amount that is a consumed amount of liquid consumed in printing for the unit number of sheets, and performs billing for printing for the same number of sheets as the number of printed sheets performed after the current maintenance, in accordance with the liquid consumption amount.

DESCRIPTION OF EXEMPLARY EMBODIMENTS

An exemplary embodiment of a liquid jet device will be described below with reference to the drawings. The liquid jet device is, for example, an ink jet-type printer that prints images such as characters and photographs on a sheet-like medium such as a sheet and a film by jetting ink, which is an example of liquid.

The liquid jet device is a printer that performs billing for an amount in accordance with an amount of liquid consumed. A user is billed, for example, for every month, for a billed amount to be billed.

First Exemplary Embodiment

Figure 1:
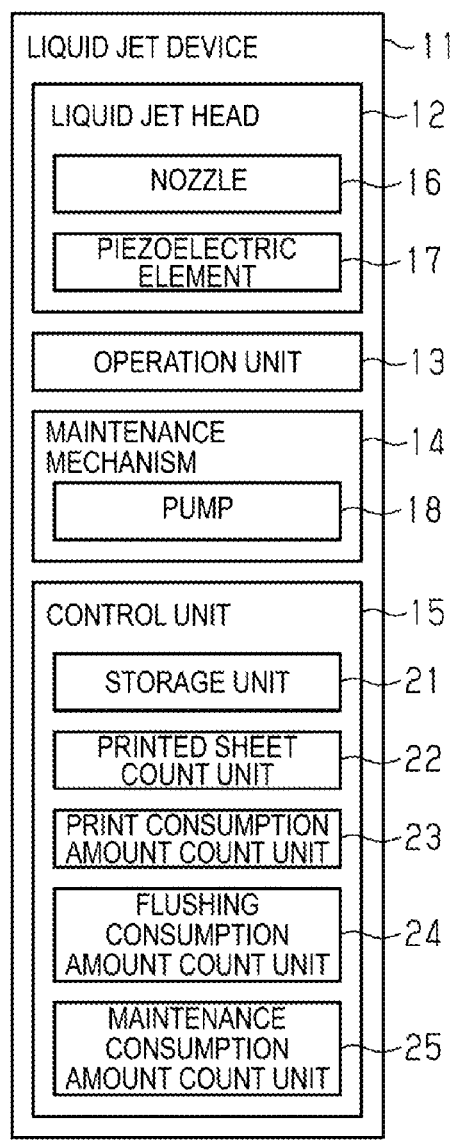
FIG. 1 is a block diagram illustrating a liquid jet device of a first exemplary embodiment.

As illustrated in FIG. 1, a liquid jet device 11 includes a liquid jet head 12, an operation unit 13, a maintenance mechanism 14, and a control unit 15.

The liquid jet head 12 is configured to jet liquid onto a medium. In the first exemplary embodiment, the liquid jet head 12 has a nozzle 16, and a piezoelectric element 17, for example. The nozzle 16 is an opening through which liquid is jetted. One or a plurality of nozzles 16 are provided. The piezoelectric element 17 is, for example, an actuator. The same number of piezoelectric elements 17 as the number of the nozzles 16 are provided. A voltage is applied to the piezoelectric element 17, and thus the liquid jet head 12 jets liquid from the nozzle 16. Thus, the liquid jet head 12 prints on a medium.

The liquid jet head 12 performs flushing as appropriate before, during, after printing, and the like. The flushing is jetting liquid independent of an image to be printed. That is, the liquid jetted by flushing is liquid that does not contribute to an image to be printed. The flushing is performed to suppress clogging of the nozzle 16. As a result, printing quality is maintained well. As such, the flushing is an operation associated with a printing operation.

The operation unit 13 is configured to operate the liquid jet device 11. The operation unit 13 is, for example, a touch panel. A user operates the liquid jet device 11 through the operation unit 13.

The maintenance mechanism 14 is a mechanism for maintaining the liquid jet head 12. The maintenance mechanism 14 includes a pump 18, for example. The maintenance mechanism 14 pressurizes or suctions an inside of the liquid jet head 12 by the pump 18 to forcibly causes liquid to be discharged from the liquid jet head 12. The maintenance mechanism 14 performs maintenance, thereby discharging thickened or solidified liquid in the liquid jet head 12 from the nozzle 16. As a result, printing quality is maintained well.

The maintenance mechanism 14 periodically maintains the liquid jet head 12. In the first exemplary embodiment, the maintenance mechanism 14 performs maintenance as appropriate based on, for example, a state inside the liquid jet head 12. In the first exemplary embodiment, a thickening state and a solidifying state of liquid inside the liquid jet head 12, presence or absence of air bubbles, and the like can be detected by the piezoelectric element 17. The maintenance mechanism 14 performs maintenance, for example, when the thickening state or the solidifying state of liquid inside the liquid jet head 12 progresses to some degree, or when there are air bubbles inside the liquid jet head 12. The maintenance mechanism 14 may perform maintenance, for example, each time printing is performed for the predetermined number of sheets of media.

The maintenance mechanism 14 may perform maintenance, for example, by being instructed by a user. In this case, the user causes the maintenance mechanism 14 to perform maintenance, for example, through the operation unit 13. The user may cause the maintenance mechanism 14 to perform maintenance through a terminal coupled to the liquid jet device 11. The terminal coupled to the liquid jet device 11 is a personal computer, a smart phone, a tablet, or the like.

The control unit 15 controls various configurations of the liquid jet device 11. In the first exemplary embodiment, the control unit 15 controls the liquid jet head 12, the operation unit 13, the maintenance mechanism 14, and the like. The control unit 15 can be constituted as a circuit including α: one or more processors configured to perform various processes in accordance with a computer program, β: one or more dedicated hardware circuits such as an application specific integrated circuit that performs some processes of various processes, or γ: a combination of the above. The processor includes a CPU, and memories such as a RAM and a ROM, and the memory is configured to store a program code or a command configured to cause the CPU to perform the process. The memory, or a computer readable medium includes any readable medium accessible by a general purpose or special purpose computer.

The control unit 15 includes a storage unit 21. The storage unit 21 is, for example, a memory such as the above-described RAM or ROM. The storage unit 21 stores various programs, and various parameters. The storage unit 21 stores information related to billing. The storage unit 21 stores a billing table as information related to billing, for example. The billing table will be described later.

The control unit 15 functions as a printed sheet count unit 22, a print consumption amount count unit 23, a flushing consumption amount count unit 24, and a maintenance consumption amount count unit 25, by executing a program stored in the storage unit 21. As such, it can be said that the control unit 15 has the printed sheet count unit 22, the print consumption amount count unit 23, the flushing consumption amount count unit 24, and the maintenance consumption amount count unit 25.

The printed sheet count unit 22 counts the number of printed sheets. The number of printed sheets is the number of sheets of media for which printing is performed by the liquid jet device 11. Each time printing is performed on a medium, the printed sheet count unit 22 counts the number of printed sheets. The printed sheet count unit 22 accumulates the number of sheets of media for which printing is performed. The number of printed sheets counted is stored in the storage unit 21.

The print consumption amount count unit 23 counts a print consumption amount. The print consumption amount is a consumed amount of liquid jetted from the liquid jet head 12 for printing on a medium. That is, the print consumption amount is an amount of liquid consumed for printing on a medium. The print consumption amount count unit 23 counts a print consumption amount, for example, by measuring a voltage applied to the piezoelectric elements 17.

The print consumption amount count unit 23 counts a print consumption amount, each time printing on media is performed for the unit number of sheets, for example. The print consumption amount count unit 23 counts a print consumption amount per unit number of sheets. The unit number of sheets will be described below. In the first exemplary embodiment, the print consumption amount count unit 23 counts a print consumption amount every one sheet. That is, the print consumption amount count unit 23, each time printing is performed on one sheet, counts a print consumption amount thereof. The print consumption amount counted is stored in the storage unit 21.

The flushing consumption amount count unit 24 counts a flushing consumption amount. The flushing consumption amount is a consumed amount of liquid jetted from the liquid jet head 12, by flushing of the liquid jet head 12. The flushing consumption amount is counted, for example, by measuring a voltage applied to the piezoelectric element 17.

The flushing consumption amount count unit 24 counts a flushing consumption amount, for example, each time printing on media is performed for the unit number of sheets. The flushing consumption amount count unit 24 counts a flushing consumption amount every unit number of sheets. In the first exemplary embodiment, the flushing consumption amount count unit 24 counts a flushing consumption amount every one sheet. As such, the flushing consumption amount count unit 24, each time printing is performed on one sheet, counts a flushing consumption amount. The flushing consumption amount counted is stored in the storage unit 21.

The maintenance consumption amount count unit 25 counts a maintenance consumption amount. The maintenance consumption amount is a consumed amount of liquid forcibly discharged from the liquid jet head 12, for maintenance of the liquid jet head 12. That is, the maintenance consumption amount is an amount of liquid discharged from the liquid jet head 12 by the maintenance mechanism 14. The maintenance consumption amount count unit 25 counts a maintenance consumption amount, for example, by measuring a voltage applied to the pump 18.

The maintenance consumption amount count unit 25 counts a maintenance consumption amount, each time maintenance is performed. The maintenance consumption amount count unit 25 counts a maintenance consumption amount, each time maintenance is performed once. The maintenance consumption amount counted is stored in the storage unit 21.

In the first exemplary embodiment, each time the control unit 15 performs printing on media for the unit number of sheets, performs billing in accordance with a liquid consumption amount set per unit number of sheets. In other words, each time printing on media is performed for the unit number of sheets, billing occurs.

The unit number of sheets is the minimum number of sheets of media for which billing occurs. In other words, when the unit number of sheets is 1, billing is performed each time printing is performed on one sheet. When the unit number of sheets is 2, billing is performed each time printing is performed on two sheets. In the first exemplary embodiment, the unit number of sheets is 1. Therefore, in the first exemplary embodiment, a liquid consumption amount is set per sheet.

The liquid consumption amount is a consumed amount that is considered to be consumed for printing on a medium. As a result, the liquid consumption amount set per unit number of sheets serves as an index of a billed amount to be billed per unit number of sheets. The liquid consumption amount set per unit number of sheets includes a print consumption amount consumed for printing on media for the unit number of sheets, and a flushing consumption amount consumed for printing on the media for the unit number of sheets.

A maintenance consumption amount consumed for performing maintenance once is very high, compared to a print consumption amount consumed for printing on one sheet, or a flushing consumption amount consumed for printing on one sheet. Thus, after maintenance is performed, a consumed amount of liquid is significantly increased, compared to before maintenance is performed.

For example, after maintenance is performed, and when an amount corresponding to a maintenance consumption amount consumed for the maintenance is immediately billed, the billed amount of increases greatly due to the maintenance performed. In this case, for example, a large difference in billed amount occurs between a month where maintenance is performed and a month where maintenance is not performed.

Compared to this, in the first exemplary embodiment, an amount corresponding to a maintenance consumption amount is divided. Specifically, a maintenance consumption amount is distributed to a liquid consumption amount set per unit number of sheets. The control unit 15 of the first exemplary embodiment sets a liquid consumption amount including a distributed maintenance consumption amount, per unit number of sheets. As a result, an amount corresponding to the maintenance consumption amount is not immediately billed, and is gradually billed as printing is performed. Thus, a great increase in billed amount by maintenance performed is suppressed.

Next, specific processing performed by the control unit 15 will be described. The processing performed by the control unit 15 is performed by executing a program stored in the storage unit 21.

The control unit 15 performs distribution processing, each time maintenance is performed. The distribution processing is processing for distributing a maintenance consumption amount to a liquid consumption amount.

Figure 2:
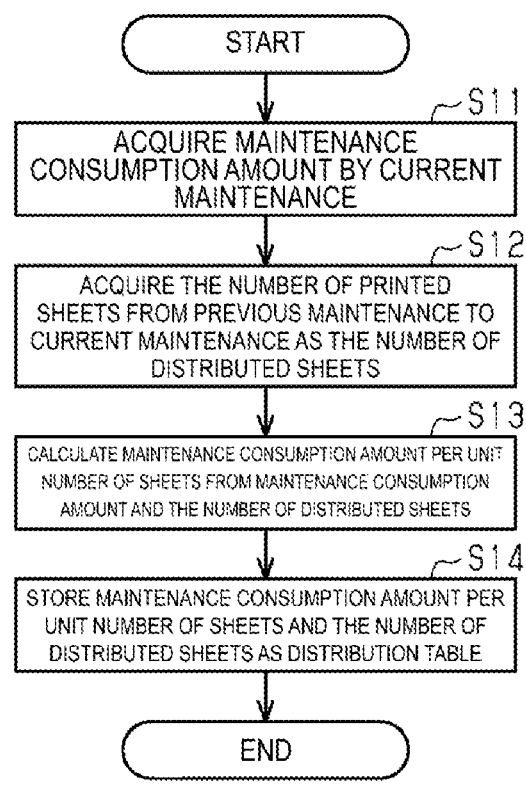
FIG. 2 is a flowchart illustrating an example of distribution processing.

As illustrated in FIG. 2, the control unit 15 performing the distribution processing acquires a maintenance consumption amount due to current maintenance in step S11. In other words, the control unit 15 acquires, in step S11, a maintenance consumption amount consumed in maintenance served as a trigger for performing this distribution processing.

In step S12, the control unit 15 acquires the number of printed sheets from previous maintenance to the current maintenance as the number of distributed sheets. In other words, the control unit 15 acquires the number of sheets of media for which printing is performed between recent maintenance and maintenance in step S12. For example, when previous maintenance is performed after printing on a 2000th medium is performed, and current maintenance is performed after printing on a 5000th medium, the number of printed sheets from the previous maintenance to the current maintenance is 3000. In this case, the number of distributed sheets is 3000. The number of distributed sheets is the number of sheets to which a maintenance consumption amount is distributed. Note that, when the current maintenance is maintenance for the first time, the control unit 15 acquires the number of printed sheets from zeroth sheet until the current maintenance as the number of distributed sheets.

In step S13, the control unit 15 calculates a maintenance consumption amount per unit number of sheets from the maintenance consumption amount and the number of distributed sheets. That is, in step S13, the control unit 15 calculates a maintenance consumption amount per sheet, by dividing the maintenance consumption amount acquired in step S11 by the number of distributed sheets acquired in step S12. In this way, the control unit 15 calculates the maintenance consumption amount per unit number of sheets.

In step S14, the control unit 15 stores the maintenance consumption amount per unit number of sheets and the number of distributed sheets as a distribution table. The distribution table is a table associated with a maintenance consumption amount per unit number of sheets and the number of distributed sheets. In other words, in step S14, the control unit 15 causes the storage unit 21 to store the maintenance consumption amount per unit number of sheets calculated in step S13, and the number of distributed sheets acquired in step S12 in a state of being associated with each other. The storage unit 21 stores a distribution table as illustrated in Table 1, for example.

TABLE 1

| Maintenance Consumption Amount Per Unit Number Of Sheets | T |
|---|---|
| Number OF Distributed Sheets | 3000 |

In the distribution table illustrated in Table 1, a maintenance consumption amount per unit number of sheets is stored as T. Additionally, the number of distributed sheets is stored as 3000. That is, "3000×T" is a maintenance consumption amount consumed in current maintenance.

When the process in step S14 is finished, the control unit 15 ends the distribution processing.

The control unit 15 performs setting processing each time printing is performed for the unit number of sheets. The setting processing is processing for setting a liquid consumption amount.

Figure 3:
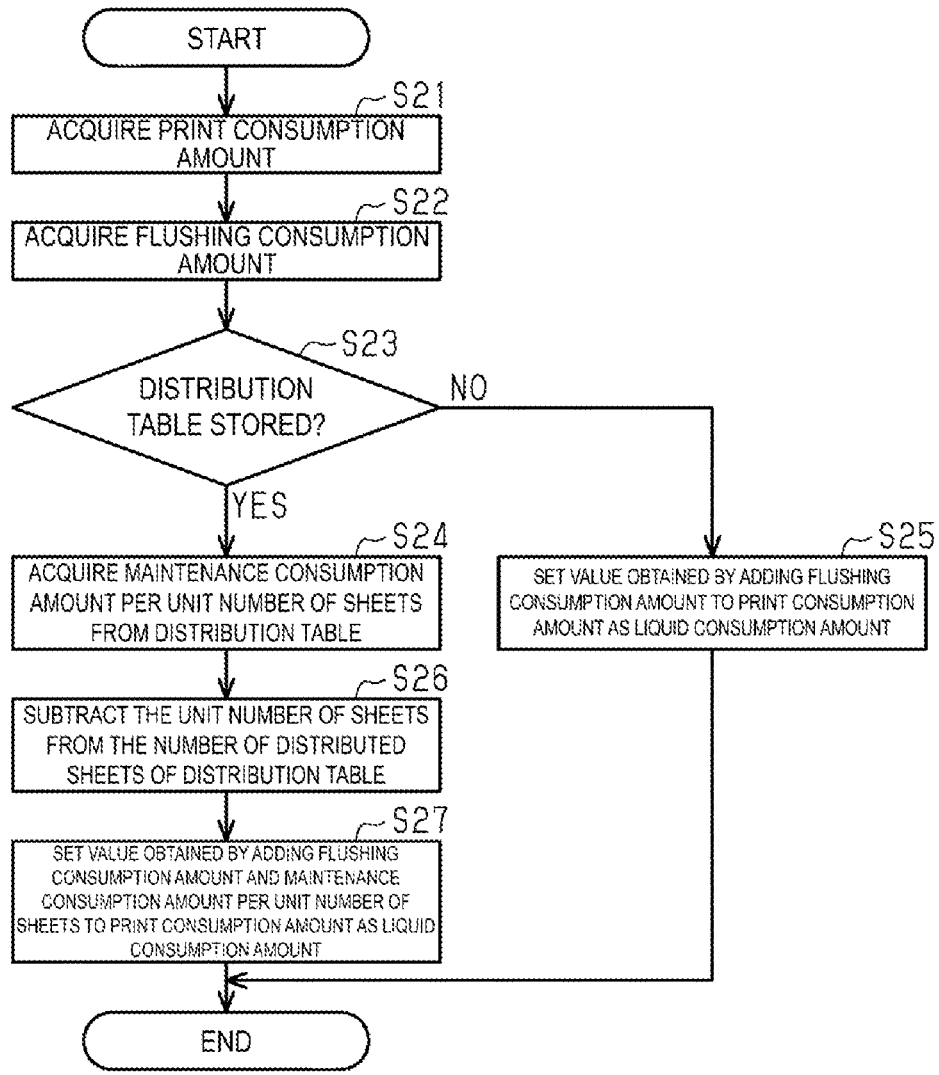
FIG. 3 is a flowchart illustrating an example of setting processing.

As illustrated in FIG. 3, the control unit 15 that performs the setting processing acquires a print consumption amount in step S21. In step S21, the control unit 15 acquires a print consumption amount consumed in printing for the unit number of sheets served as a trigger for performing this setting processing. In other words, the control unit 15 acquires a print consumption amount for the unit number of sheets.

The control unit 15 acquires a flushing consumption amount in step S22. In step S22, the control unit 15 acquires a flushing consumption amount consumed in printing for the unit number of sheets served as the trigger for performing this setting processing. In other words, the control unit 15 acquires a flushing consumption amount for the unit number of sheets.

In step S23, the control unit 15 determines whether a distribution table is stored in the storage unit 21 or not. When the distribution table is stored in the storage unit 21, the control unit 15 transitions the processing to step S24. When a distribution table is not stored in the storage unit 21, the processing transitions to step S25.

In step S24, the control unit 15 acquires a maintenance consumption amount per unit number of sheets from the distribution table. In step S24, the control unit 15 acquires a maintenance consumption amount distributed for the unit number of sheets.

In step S26, the control unit 15 subtracts the unit number of sheets from the number of distributed sheets in the distribution table. In other words, the control unit 15 subtracts the unit number of sheets from the number of distributed sheets corresponding to the maintenance consumption amount per unit number of sheets acquired. For example, when the control unit 15 acquires "T", which is the maintenance consumption amount per unit number of sheets from the distribution table illustrated in Table 1, the control unit 15 subtracts the unit number of sheets from the number of distributed sheets corresponding to "T". For example, when the number of distributed sheets in the distribution table illustrated in Table 1 is 3000, the control unit 15 subtracts 1 from 3000. As a result, the number of distributed sheets in the distribution table becomes 2999. When the number of distributed sheets becomes 0 by subtraction, the control unit 15 deletes the number of distributed sheets and the maintenance consumption amount per unit number of sheets corresponding thereto from the storage unit 21.

In step S27, the control unit 15 sets, as a liquid consumption amount, a value obtained by adding the flushing consumption amount and the maintenance consumption amount per unit number of sheets to the print consumption amount. In step S27, the control unit 15 adds the flushing consumption amount acquired in step S22, and the maintenance consumption amount per unit number of sheets acquired in step S24, to the print consumption amount acquired in step S21. As a result, the control unit 15 sets a liquid consumption amount for printing for the unit number of sheets served as the trigger for performing this setting processing. When the process in step S27 is finished, the control unit 15 ends the setting processing.

In step S25, the control unit 15 sets, as a liquid consumption amount, a value obtained by adding the flushing consumption amount to the print consumption amount. In step S25, the control unit 15 adds the flushing consumption amount acquired in step S22 to print consumption amount acquired in step S21. As a result, the control unit 15 sets a liquid consumption amount for printing for the unit number of sheets served as the trigger for performing this setting processing. When the process in step S25 is finished, the control unit 15 ends the setting processing. In this way, the control unit 15 sets a liquid consumption amount per unit number of sheets, by performing the setting processing each time printing is performed for the unit number of sheets.

The control unit 15 performs billing in accordance with a set liquid consumption amount. In the first exemplary embodiment, a billed amount to be billed for printing for the unit number of sheets is divided into a plurality of stages in accordance with liquid consumption amount thereof. In the first exemplary embodiment, the billed amount is divided into three stages, for example. In the first exemplary embodiment, three patterns having billed amounts different from each other are stored in the storage unit 21, such as a billing table illustrated in Table 2, for example.

TABLE 2

|  | First Pattern | Second Pattern | Third Pattern |
| --- | --- | --- | --- |
| Liquid Amount | Duty 0.0% to Duty 4.9% | Duty 5.0% to Duty 9.9% | Duty 10.0% |
| Quantity | X | Y | Z |

The billing table illustrated in Table 2 is divided into a first pattern, a second pattern, and a third pattern having liquid amounts different from each other. A liquid amount of the first pattern is from Duty 0.0% to Duty 4.9%. A liquid amount of the second pattern is from Duty 5.0% to Duty 9.9%. A liquid amount of the third pattern is equal to or greater than Duty 10.0%. The liquid amount of each pattern may be changed as needed.

Duty is a percentage when the maximum print consumption amount for the unit number of sheets of media is defined as 100%. The maximum print consumption amount is the maximum consumption amount of liquid consumed in printing for the unit number of sheets. That is, a print consumption amount when printing on entire areas of the unit number of sheets of media corresponds to Duty 100%. In the first exemplary embodiment, a billed amount to be billed for printing for the unit number of sheets is divided into a plurality of stages, in accordance with a percentage of a liquid consumption amount based on the maximum print consumption amount for the unit number of sheets, that is, Duty. In the first exemplary embodiment, a billed amount is divided into three stages in accordance with a percentage of a liquid consumption amount.

The control unit 15 determines a pattern to which a set liquid consumption amount corresponds. The control unit 15 counts a quantity of the pattern to which the set liquid consumption amount corresponds. Therefore, in the billing table, a quantity corresponding to each pattern is associated with a liquid consumption amount corresponding to each pattern. A quantity X indicating the first pattern, a quantity Y indicating the second pattern, and a quantity Z indicating the third pattern are stored in the billing table illustrated in Table 2.

In the first exemplary embodiment, the control unit 15 counts the quantity X for which printing is performed with the first pattern, the quantity Y for which printing is performed with the second pattern, and the quantity Z for which printing is performed with the third pattern. The control unit 15 performs billing by counting the quantity of each pattern. Specifically, after performing setting processing, that is, after setting a liquid consumption amount per unit number of sheets, the control unit 15 performs billing processing to perform billing. The billing processing is processing for performing billing in accordance with a set liquid consumption amount.

Figure 4:
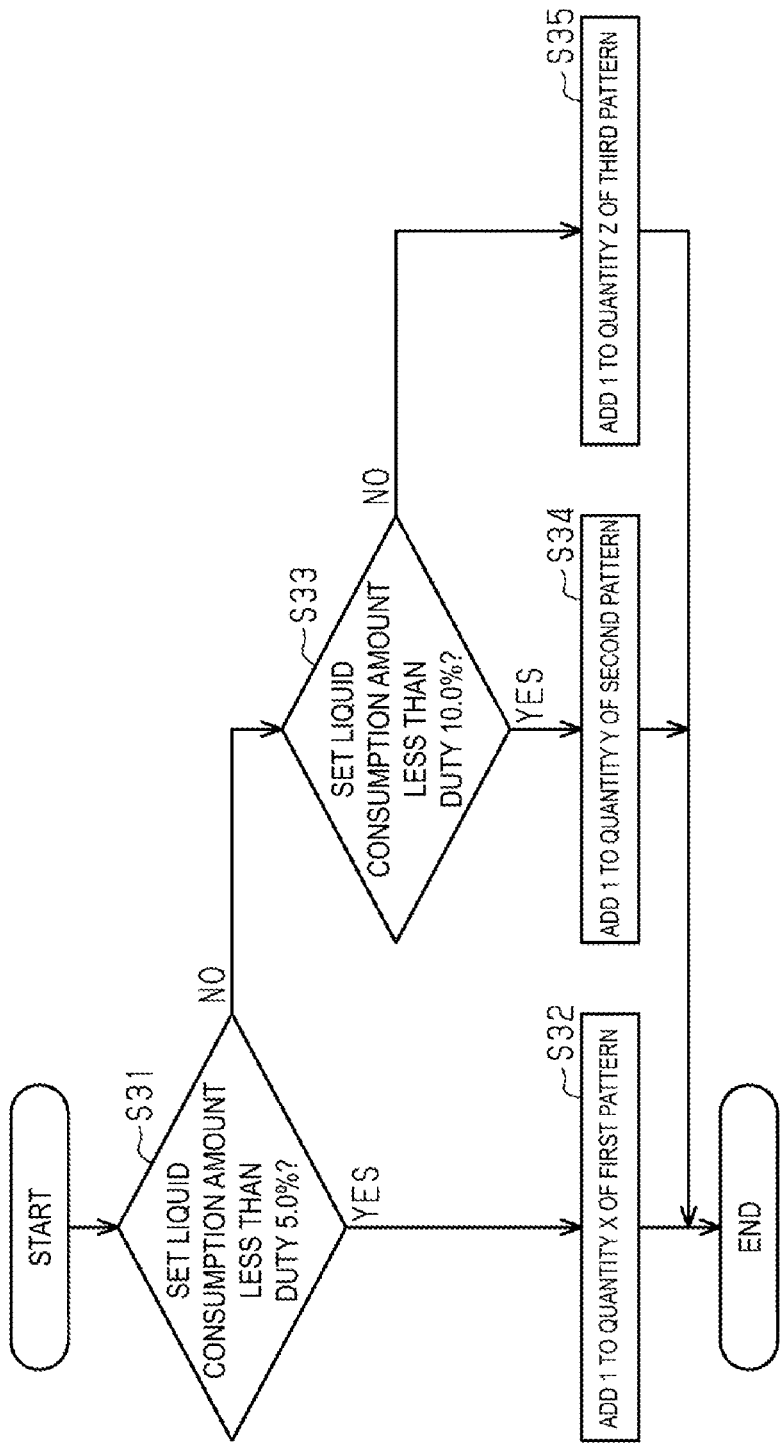
FIG. 4 is a flowchart illustrating an example of billing processing.

As illustrated in FIG. 4, the control unit 15 determines in step S31 whether a set liquid consumption amount is less than Duty 5.0% or not. In other words, the control unit 15 determines in step S31 whether a set liquid consumption amount corresponds to the first pattern or not. When a set liquid consumption amount is less than Duty 5.0%, the control unit 15 transitions the processing to step S32. When a set liquid consumption amount is not less than Duty 5.0%, that is, a set liquid consumption amount is equal to or greater than Duty 5.0%, the control unit 15 transitions the processing to step S33.

In step S32, the control unit 15 adds 1 to the quantity X of the first pattern. In other words, the control unit 15 increments the quantity X of the first pattern in step S32. When the process in step S32 is finished, the control unit 15 ends the billing processing.

In step S33, the control unit 15 determines whether the set liquid consumption amount is less than Duty 10.0% or not. In other words, the control unit 15 determines in step S33 whether the set liquid consumption amount corresponds to the second pattern or not. When the set liquid consumption amount is less than Duty 10.0%, the control unit 15 transitions the processing to step S34. When the set liquid consumption amount is not less than Duty 10.0%, that is, the set liquid consumption amount is equal to or greater than Duty 10.0%, the control unit 15 transitions the processing to step S35.

In step S34, the control unit 15 adds 1 to the quantity Y of the second pattern. In other words, the control unit 15 increments the quantity Y of the second pattern in step S34. When the process in step S34 is finished, the control unit 15 ends the billing processing.

In step S35, the control unit 15 adds 1 to the quantity Z of the third pattern. In other words, the control unit 15 increments the quantity Z of the third pattern in step S35. When the process in step S35 is finished, the control unit 15 ends the billing processing.

By multiplying the quantity X of the first pattern by a unit value of the first pattern, a billed amount to be billed by performing printing with the liquid consumption amount corresponding to the first pattern is calculated. By multiplying the quantity Y of the second pattern by a unit value of the second pattern, a billed amount to be billed by performing printing with the liquid consumption amount corresponding to the second pattern is calculated. By multiplying the quantity Z of the third pattern by a unit value of the third pattern, a billed amount to be billed by performing printing with the liquid consumption amount corresponding to the third pattern is calculated. By adding the billed amount of the first pattern, the billed amount of the second pattern, and the billed amount of the third pattern together, a total billed amount to be billed in accordance with the liquid consumption amount is calculated.

In the first exemplary embodiment, the storage unit 21 does not store information indicating the unit value of each pattern, but may store the unit value. In the first exemplary embodiment, for example, a service man to perform repair, management, or the like of the liquid jet device 11 holds information indicating the unit value of each pattern. In this case, the service man calculates a billed amount by obtaining a quantity of each pattern stored in the storage unit 21, and notifies a user of a billed amount thereof. In this manner, counting the quantity of each pattern every time printing is performed for the unit number of sheets of media is synonymous with billing. That is, the processes in step S32, step S34, and step S35 are processing that performs billing. The quantity of each pattern is information regarding the billing. In this way, the control unit 15 determines a billed amount to be billed for printing in accordance with a percentage of a liquid consumption amount based on the maximum print consumption amount.

As described above, after current maintenance, by performing printing on the same number of sheets as the number of distributed sheets that is the number of printed sheets from previous maintenance to the current maintenance, billing for an amount corresponding to a maintenance consumption amount consumed in the current maintenance is completed. According to the above-described distribution processing, setting processing, and billing processing, the control unit 15 performs billing for printing on the same number of sheets as the number of distributed sheets performed after maintenance, in accordance with a liquid consumption amount including a maintenance consumption amount. As a result, a large increase in billed amount by maintenance can be suppressed, and billing is appropriately performed for a maintenance consumption amount.

Next, redistribution processing performed by the control unit 15 will be described. The redistribution processing is processing performed in place of distribution processing when maintenance is performed while a distribution table is stored in the storage unit 21. That is, the redistribution processing is performed, when maintenance is performed before billing for an amount corresponding to a maintenance consumption amount consumed in previous maintenance is completed.

Figure 5:
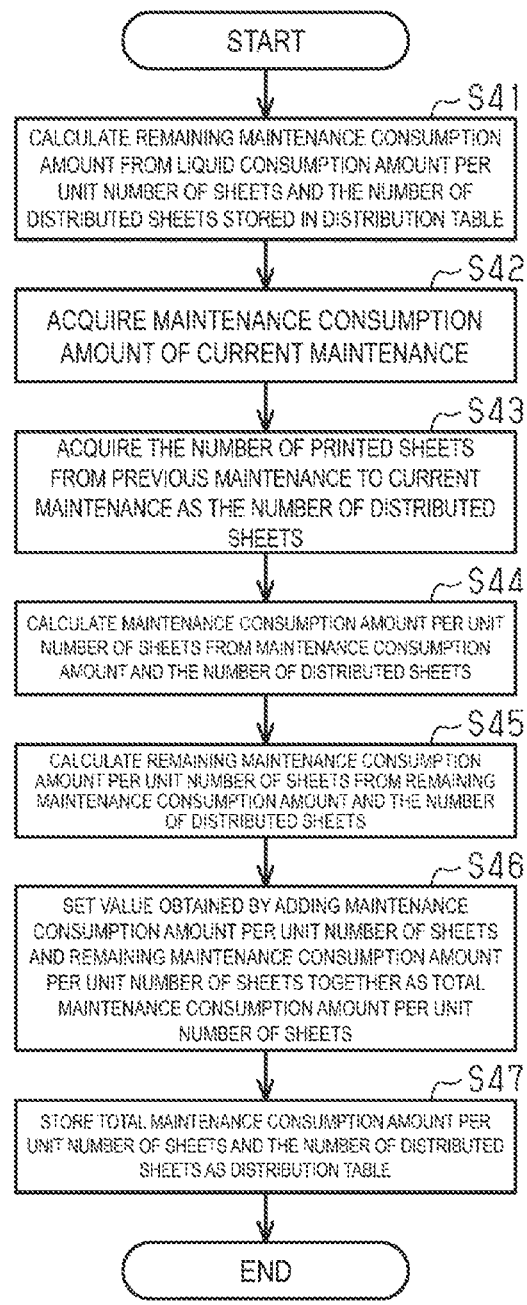
FIG. 5 is a flowchart illustrating an example of redistribution processing.

As illustrated in FIG. 5, the control unit 15 that performs the redistribution processing, in step S41. calculates a remaining maintenance consumption amount from a liquid consumption amount per unit number of sheets and the number of distributed sheets stored in a distribution table. The remaining maintenance consumption amount refers to a consumed amount of a maintenance consumption amount consumed in previous maintenance for which billing is not completed. That is, in step S41, the control unit 15 sets a value calculated by multiplying a liquid consumption amount per unit number of sheets and the number of distributed sheets stored in the distribution table together, as a remaining maintenance consumption amount. For example, when a liquid consumption amount per unit number of sheets stored in the distribution table is T, and the number of distributed sheets is 2000, "2000×T" is a consumed amount of a maintenance consumption amount consumed in previous maintenance for which billing is not completed.

In step S42, the control unit 15 acquires a maintenance consumption amount by current maintenance. In other words, the control unit 15 acquires, in step S42, a maintenance consumption amount consumed in maintenance served as a trigger for performing this redistribution processing.

In step S43, the control unit 15 acquires the number of printed sheets from the previous maintenance to the current maintenance as the number of distributed sheets. In other words, the control unit 15 acquires the number of sheets of media for which printing is performed between recent maintenance and maintenance in step S43. For example, when previous maintenance is performed after printing on a 5000th medium, and current maintenance is performed after printing on a 6000th medium, the number of printed sheets from the previous maintenance to the current maintenance is 1000.

In step S44, the control unit 15 calculates a maintenance consumption amount per unit number of sheets from the maintenance consumption amount and the number of distributed sheets. That is, in step S44, the control unit 15 calculates a maintenance consumption amount per sheet, by dividing the maintenance consumption amount acquired in step S42 by the number of distributed sheets acquired in step S43. In this way, the control unit 15 calculates the maintenance consumption amount per unit number of sheets.

In step S45, the control unit 15 calculates a remaining maintenance consumption amount per unit number of sheets from the maintenance consumption amount and the number of distributed sheets. That is, the control unit 15 calculates a remaining maintenance consumption amount per sheet, by dividing the remaining maintenance consumption amount calculated in step S41 by the number of distributed sheets acquired in step S43. In this way, the control unit 15 calculates a remaining maintenance consumption amount per unit number of sheets.

In step S46, the control unit 15 sets a value obtained by adding the maintenance consumption amount per unit number of sheets and the remaining maintenance consumption amount per unit number of sheets together, as a total maintenance consumption amount per unit number of sheets. The total maintenance consumption amount is an amount obtained by adding the remaining maintenance consumption amount calculated in step S41 and the maintenance consumption amount obtained in step S42 together. That is, a total maintenance consumption amount is a consumed amount of a maintenance consumption amount consumed in maintenance thus far for which billing is not completed.

In step S47, the control unit 15 stores, as a distribution table, the total maintenance consumption amount per unit number of sheets and the number of distributed sheets. In other words, in step S46, the control unit 15 causes the storage unit 21 to store the total maintenance consumption amount per unit number of sheets calculated in step S46 and the number of distributed sheets acquired in step S43 in a state of being associated with each other. As a result, the storage unit 21 stores a distribution table as illustrated in Table 3, for example. In other words, in step S47, instead of the distribution table illustrated in Table 1, the control unit 15 causes the storage unit 21 to store a new distribution table. It can also be said that the control unit 15 updates the distribution table.

TABLE 3

| Total Maintenance Consumption Amount Per Unit Number Of Sheets | U |
|---|---|
| Number OF Distributed Sheets | 1000 |

In the distribution table illustrated in Table 3, a total maintenance consumption amount per unit number of sheets is stored as U. Additionally, the number of distributed sheets is stored as 1000. That is, "1000×U" is a total maintenance consumption amount. Thus, in the redistribution processing, a consumed amount of a maintenance consumption amount consumed in previous maintenance for which billing is not completed is redistributed with the newly acquired number of distributed sheets. When the process in step S47 is finished, the control unit 15 ends the redistribution processing.

Next, a case is considered in which setting processing is performed after redistribution processing is performed. Here, only different points will be described in comparison to a case in which the setting processing is performed after the distribution processing is performed.

As illustrated in FIG. 3, the control unit 15 performing the setting processing after performing the redistribution processing acquires, in step S24, a total maintenance consumption amount per unit number of sheets from a distribution table.

In step S26, the control unit 15 subtracts the unit number of sheets from the number of distributed sheets in the distribution table. In other words, the control unit 15 subtracts the unit number of sheets from the number of distributed sheets corresponding to the total maintenance consumption amount per unit number of sheets acquired in step S24.

In step S27, the control unit 15 sets, as a liquid consumption amount, a value obtained by adding a flushing consumption amount and a total maintenance consumption amount per unit number of sheets to a print consumption amount. When the process in step S27 is finished, the control unit 15 ends the setting processing. The control unit 15 after finishing the setting processing performs billing in accordance with this liquid consumption amount by performing billing processing.

Figure 6:
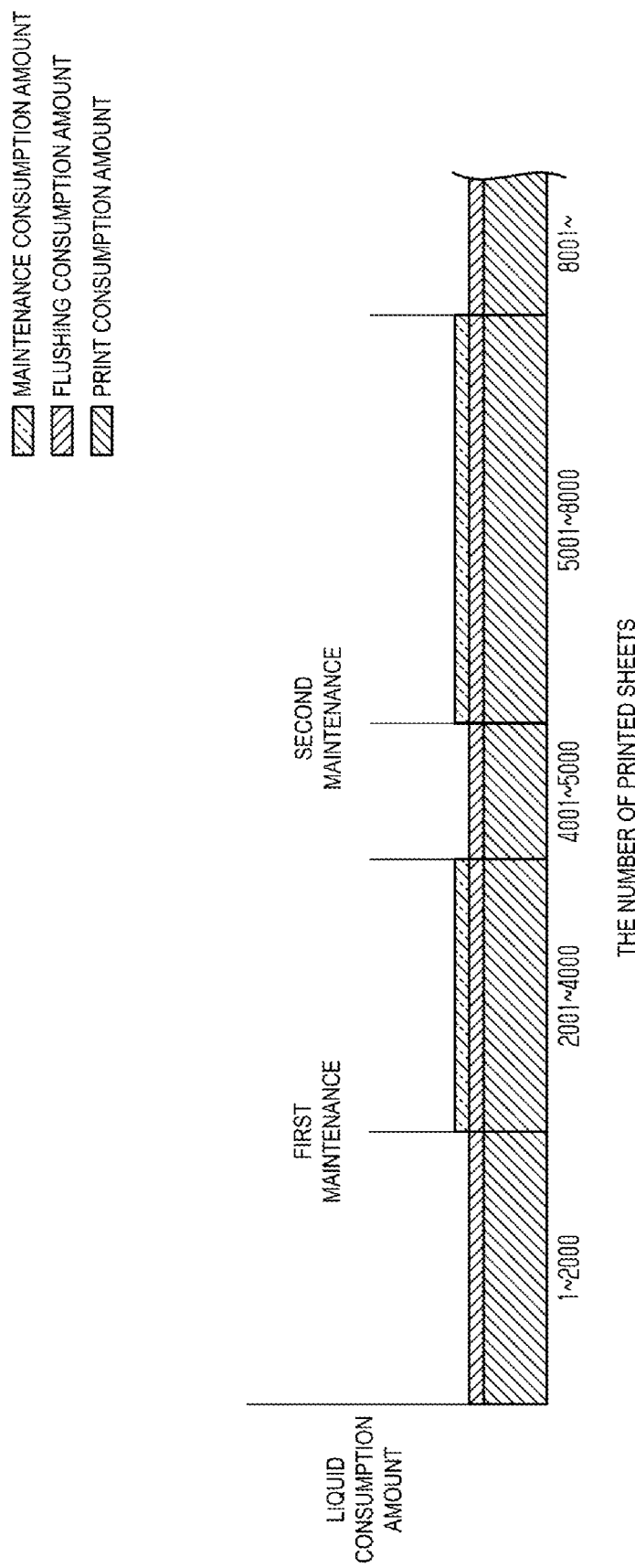
FIG. 6 is a schematic diagram illustrating a first model.

In the first exemplary embodiment, a first model illustrated in FIG. 6 is conceivable, for example, by performing the above-described various types of the processing.

As illustrated in FIG. 6, the first model is a model in which maintenance is performed after printing on a 2000th sheet and after printing on a 5000th sheet. In the first model, maintenance performed after printing on the 2000th sheet is referred to as first maintenance and maintenance performed after printing on the 5000th sheet is referred to as second maintenance. The first model represents a breakdown of a liquid consumption amount set per printing.

A liquid consumption amount set for printing on a 1st sheet to the 2000th sheet includes a print consumption amount and a flushing consumption amount.

A liquid consumption amount set for printing on a 2001st sheet to a 4000th sheet includes a print consumption amount, a flushing consumption amount, and a maintenance consumption amount consumed in the first maintenance. As a result, billing is gradually performed for an amount corresponding to the maintenance consumption amount consumed in the first maintenance, during printing on the 2001st sheet to the 4000th sheet.

A liquid consumption amount set for printing on a 4001st sheet to a 5000th sheet includes a print consumption amount and a flushing consumption amount. The liquid consumption amount set for printing on the 4001st sheet to the 5000th sheet does not include the maintenance consumption amount consumed in the first maintenance. The reason for this is that for the amount corresponding to the maintenance consumption amount consumed in the first maintenance, billing is already completed when printing on the 4000th sheet.

A liquid consumption amount set for printing on a 5001st sheet to an 8000th sheet includes a print consumption amount, a flushing consumption amount, and a maintenance consumption amount consumed in the second maintenance. Billing is gradually performed for an amount corresponding to the maintenance consumption amount consumed in the second maintenance, during printing on the 5001st sheet to the 8000th sheet. Thus, in the first model, billing is performed for printing, performed after the current maintenance, for the same number of sheets as the number of printed sheets from the previous maintenance to the current maintenance, in accordance with the liquid consumption amount including a maintenance consumption amount per unit number of sheets.

A liquid consumption amount set for printing on an 8001st sheet and later includes a print consumption amount and a flushing consumption amount. The liquid consumption amount set for printing on the 8001st sheet and later does not include the maintenance consumption amount consumed in the second maintenance. The reason for this is that for the amount corresponding to the maintenance consumption amount consumed in the second maintenance, billing is already completed when printing on the 8000th sheet.

Next, a second model is considered in which, in the first model described above, maintenance is performed after printing on the 6000th sheet.

Figure 7:
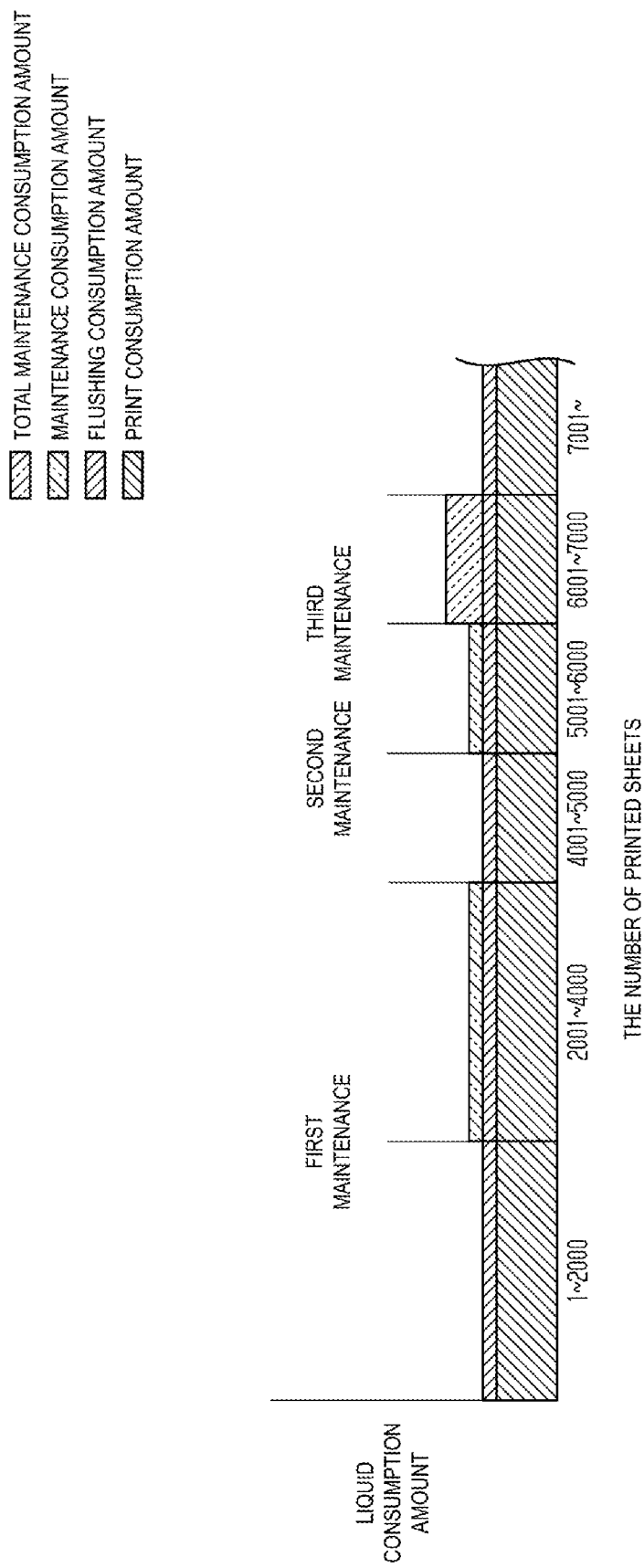
FIG. 7 is a schematic diagram illustrating a second model.

As illustrated in FIG. 7, in the second model, in addition to performing first maintenance after printing on a 2000th sheet, and performing second maintenance after printing on a 5000th sheet, third maintenance is performed after printing on a 6000th sheet. Thus, the third maintenance is maintenance performed after the second maintenance.

The second model is a model for a case in which, after the second maintenance is performed, and before printing on the same number of sheets as the number of printed sheets from the first maintenance to the second maintenance is completed, the third maintenance is performed. That is, the second model is a model for a case in which next maintenance is performed before billing for a maintenance consumption amount by current maintenance is completed. In the second model, a liquid consumption amount set for printing on the 1st sheet to the 5000th sheet is similar to that in the first model.

A liquid consumption amount set for printing on a 5001st sheet to a 6000th sheet includes a print consumption amount, a flushing consumption amount, and a maintenance consumption amount consumed in the second maintenance. As in the first model, when the third maintenance is not performed after printing on the 6000th sheet, specifically, when the third maintenance is not performed until printing on an 8000th sheet, billing is completed for an amount corresponding to the maintenance consumption amount consumed in a second maintenance consumption amount, when printing on the 8000th sheet. However, in the second model, unlike the first model, the third maintenance is performed not later than printing on the 8000th sheet, specifically, the third maintenance is performed after printing on the 6000th sheet. In this case, the third maintenance is performed before billing for the amount corresponding to the maintenance consumption amount consumed in the second maintenance is completed. Thus, in the second model, the redistribution processing is performed instead of distribution processing after the third maintenance is performed.

In the second model, in order to distinguish between the maintenance consumption amount consumed in the second maintenance and a maintenance consumption amount consumed in the third maintenance, the former is referred to as a first maintenance consumption amount, and the latter is referred to as a second maintenance consumption amount. That is, in the second model, during the third maintenance is performed, a consumed amount of the first maintenance consumption amount for which billing is not completed corresponds to a remaining maintenance consumption amount.

In the second model, in order to distinguish between the number of printed sheets from the first maintenance to the second maintenance, and the number of printed sheets from the second maintenance to the third maintenance, the former is referred to as the first number of printed sheets, and the latter is referred to as the second number of printed sheets. In the second model, the first number of printed sheets is greater than the second number of printed sheets. In the second model, the first number of printed sheets is 3000, and the second number of printed sheets is 1000.

A liquid consumption amount set for printing on a 6001st sheet to a 7000 sheet, that is, printing for the same number of sheets as the second number of printed sheets performed after the third maintenance, includes a print consumption amount, a flushing consumption amount, and a total maintenance consumption amount. That is, the liquid consumption amount set for printing on the 6001st sheet to the 7000th sheet includes the print consumption amount, the flushing consumption amount, a remaining maintenance consumption amount, and the second maintenance consumption amount.

In the second model, the remaining maintenance consumption amount is for 2000 sheets of the second maintenance consumption amount distributed to 3000 sheets. That is, in the second model, two-thirds of the second maintenance consumption amount corresponds to the remaining maintenance consumption amount. Billing is gradually performed for an amount corresponding to the total maintenance consumption amount, during printing on the 6001st sheet to the 7000th sheet. Thus, in the second model, billing is performed, for printing on the same number of sheets as the second number of printed sheets performed after the third maintenance, in accordance with the liquid consumption amount including a total maintenance consumption amount per unit number of sheets.

In the second model, in order to distinguish between a liquid consumption amount set through the distribution processing and a liquid consumption amount set through the redistribution processing, the former is referred to as a first liquid consumption amount, and the latter is referred to as a second liquid consumption amount. That is, a liquid consumption amount set for printing on a 2001st sheet to a 4000th sheet, and a liquid consumption amount set for printing on the 5001st sheet to the 6000th sheet are each the first liquid consumption amount. A liquid consumption amount set for printing on the 6001st sheet to the 7000th sheet is the second liquid consumption amount. The second liquid consumption amount includes a total maintenance consumption amount per unit number of sheets. In the second model, billing is performed for printing on the same number of sheets as the second number of printed sheets performed after the third maintenance, in accordance with the second liquid consumption amount.

A liquid consumption amount set for printing on the 7001st sheet and later includes a print consumption amount and a flushing consumption amount. The liquid consumption amount set for printing on the 7001st sheet and later does not include a total maintenance consumption amount. The reason for this is that for an amount corresponding to the total maintenance consumption amount, billing is already completed when printing on the 7000th sheet.

Next, functions and effects of the first exemplary embodiment will be described.

(1) The control unit 15 performs billing for printing on the same number of sheets as the first number of printed sheets performed after second maintenance, in accordance with a liquid consumption amount.

The liquid consumption amount includes a first maintenance consumption amount, which is a consumed amount of liquid consumed in the second maintenance, in a state of being divided per unit number of sheets. That is, with respect to an amount corresponding to the first maintenance consumption amount, billing is gradually performed for printing for the same number of sheets as the first number of printed sheets performed after the second maintenance. Therefore, according to the first exemplary embodiment, compared to a case where billing is immediately performed for the amount corresponding to the first maintenance consumption amount, a large increase in billed amount by performing maintenance is suppressed.

(2) The control unit 15 performs billing for printing on the same number of sheets as the second number of printed sheets performed after third maintenance, in accordance with a second liquid consumption amount.

The second liquid consumption amount includes a second maintenance consumption amount, which is a consumed amount of liquid consumed in the third maintenance, in a state of being divided per unit number of sheets. That is, with respect to an amount corresponding to the second maintenance consumption amount, billing is gradually performed for printing for the same number of sheets as the second number of printed sheets performed after the third maintenance. Further, the second liquid consumption amount includes a remaining maintenance consumption amount of the first maintenance consumption amount, for which billing is not completed, in a state of being divided per unit number of sheets. In other words, with respect to an amount corresponding to the remaining maintenance consumption amount, billing is gradually performed for printing for the same number of sheets as the second number of printed sheets performed after the third maintenance. Therefore, according to the first exemplary embodiment, even when maintenance is performed at a short interval, a large increase in billed amount is suppressed.

(3) The control unit 15 determines a billed amount to be billed for printing, in accordance with a percentage of a liquid consumption amount based on the maximum print consumption amount, that is the maximum consumption amount of liquid consumed in printing for the unit number of sheets.

As a result, billing can be appropriately performed in accordance with the percentage of the liquid consumption amount.

(4) A billed amount is divided into three stages in accordance with the percentage of the liquid consumption amount.

As a result, the billed amount can be set comprehensibly for a user.

Second Exemplary Embodiment

Next, a second exemplary embodiment of the liquid jet device 11 will be described. The second exemplary embodiment differs from the first exemplary embodiment only in a method of distributing a maintenance consumption amount to a liquid consumption amount. Accordingly, in the second exemplary embodiment, points different from those of the first exemplary embodiment will be mainly described.

In the second exemplary embodiment, without redistributing a maintenance consumption amount, distribution processing is performed each time maintenance is performed. In other words, in the second exemplary embodiment, the control unit 15 performs the distribution processing, even when maintenance is performed in a state in which a distribution table is stored in the storage unit 21. The control unit 15 performs the distribution processing, even when maintenance is performed before billing for an amount corresponding to a maintenance consumption amount consumed in previous maintenance is completed.

For example, a case is considered in which, after maintenance is performed after printing on a 2000th sheet is performed and after printing on a 5000th sheet is performed, maintenance is to be performed after printing on a 6000th sheets. In this case, the distribution processing is performed after maintenance performed after printing on the 6000th sheet, and thus a distribution table as illustrated in Table 4 is stored in the storage unit 21.

TABLE 4

| Maintenance Consumption Amount Per Unit Number Of Sheets | V | W |
|---|---|---|
| Number OF Distributed Sheets | 2000 | 1000 |

As illustrated in Table 4, in the second exemplary embodiment, a plurality of maintenance consumption amounts per unit number of sheets, and the numbers of distributed sheets corresponding thereto are stored in the distribution table. In the distribution table illustrated in Table 4, a parameter that is a maintenance consumption amount per unit number of sheets named V is associated with a parameter that is the number of distributed sheets of 2000. Further, in the distribution table illustrated in Table 4, a parameter that is a maintenance consumption amount per unit number of sheets named W is associated with a parameter that is the number of distributed sheets of 1000. Thus, in the second exemplary embodiment, the plurality of maintenance consumption amounts by multiple times of maintenance are each individually stored.

Next, setting processing performed by the control unit 15 of the second exemplary embodiment will be described. Here, only different points will be described in comparison to the setting processing in the first exemplary embodiment. As illustrated in FIG. 3, the control unit 15 performing the setting processing acquires, in step S24, a maintenance consumption amount per unit number of sheets from a distribution table. When a plurality of maintenance consumption amounts per unit number of sheets are stored in the distribution table, the control unit 15 acquires the plurality of maintenance consumption amounts per unit number of sheets from the distribution table.

In step S26, the control unit 15 subtracts the unit number of sheets from the number of distributed sheets in the distribution table. When the control unit 15 acquires the plurality of maintenance consumption amounts per unit number of sheets in step S24, the control unit 15 subtracts the unit number of sheets from a plurality of number of distributed sheets corresponding to the plurality of the maintenance consumption amounts respectively.

In step S27, the control unit 15 sets, as a liquid consumption amount, a value obtained by adding a flushing consumption amount and the maintenance consumption amount per unit number of sheets to a print consumption amount. When the control unit 15 acquires the plurality of maintenance consumption amounts per unit number of sheets in step S24, the control unit 15 sets, as a liquid consumption amount, a value obtained by adding the flushing consumption amount, and the plurality of maintenance consumption amounts per unit number of sheets to a print consumption amount.

Figure 8:
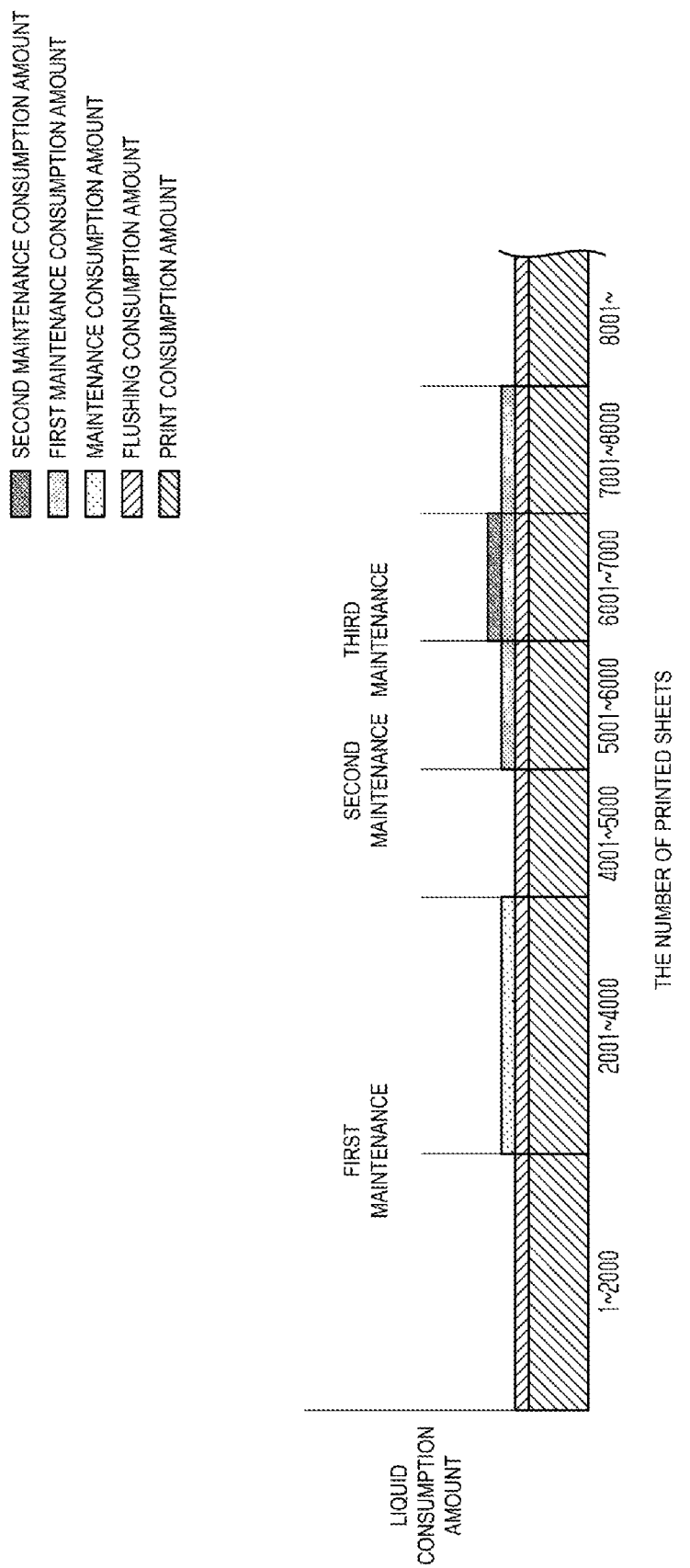
FIG. 8 is a schematic diagram illustrating a third model for a liquid jet device of a second exemplary embodiment.

In the second exemplary embodiment, a third model illustrated in FIG. 8 is conceivable, for example, by performing the various types of processing described above. The third model is, similar to a second model, a model in which first maintenance after printing on a 2000th sheet, second maintenance after printing on a 5000th sheet, third maintenance after printing on a 6000th sheet, are performed.

The third model, similar to the first model, and the second model, represents a breakdown of a liquid consumption amount set per printing.

The third model is a model for a case in which, similar to the second model, after the second maintenance is performed, and before printing for the same number of sheets as the number of printed sheets from the first maintenance to the second maintenance is completed, the third maintenance is performed. That is, the third model is a model, similar to the second model, for a case in which next maintenance is performed before billing for a maintenance consumption amount by current maintenance is completed. In the third model, distribution processing is performed again after the third maintenance is performed. In the third model, a liquid consumption amount set for printing on a 1st sheet to a 5000th sheet is similar to that in the second model.

In the third model, similar to the second model, in order to distinguish between a maintenance consumption amount consumed in the second maintenance and a maintenance consumption amount consumed in the third maintenance, the former is referred to as a first maintenance consumption amount and the latter is referred to as a second maintenance consumption amount.

In the third model, similar to the second model, in order to distinguish between the number of printed sheets from the first maintenance to the second maintenance, and the number of printed sheets from the second maintenance to the third maintenance, the former is referred to as the first number of printed sheets, and the latter is referred to as the second number of printed sheets. In the third model, the first number of printed sheets is greater than the second number of printed sheets. The first number of printed sheets is 3000, and the second number of printed sheets is 1000.

As illustrated in FIG. 8, a liquid consumption amount set for printing on a 5001st sheet to a 6000th sheet includes a print consumption amount, a flushing consumption amount, and a first maintenance consumption amount consumed in the second maintenance. In the third model, a value obtained by adding a flushing consumption amount and a first maintenance consumption amount per unit number of sheets to a print consumption amount is referred to as a first liquid consumption amount.

A liquid consumption amount set for printing on a 6001st sheet to a 7000th sheet includes a print consumption amount, a flushing consumption amount, the first maintenance consumption amount, and the second maintenance consumption amount. That is, the liquid consumption amount set for printing on the 6001st sheet to the 7000th sheet is a value obtained by adding a second maintenance consumption amount per unit number of sheets to the first liquid consumption amount. In the third model, the value obtained by adding the second maintenance consumption amount per unit number of sheets to the first liquid consumption amount is referred to as a second liquid consumption amount. Billing is gradually performed for an amount corresponding to the second maintenance consumption amount, during printing on the 6001st sheet to the 7000th sheet.

A liquid consumption amount set for printing on a 7001st sheet to an 8000th sheet includes a print consumption amount, a flushing consumption amount, and the first maintenance consumption amount. In other words, the first liquid consumption amount is set for printing on the 7001st sheet to the 8000th sheet. The liquid consumption amount set for printing on the 7001st sheet to the 8000th sheet does not include the second maintenance consumption amount. The reason for this is that for the amount corresponding to the second maintenance consumption amount, billing is already completed when printing on the 7000th sheet. Billing is gradually performed for an amount corresponding to the first maintenance consumption amount during printing on the 5001st sheet to the 8000th sheet.

In the third model, printing for the same number of sheets as the second number of printed sheets performed after the third maintenance overlaps with printing for the same number of sheets as the first number of printed sheets performed after the second maintenance. Of printing for the same number of sheets as the second number of printed sheets performed after the third maintenance, printing overlapping with printing for the same number of sheets as the first number of printed sheets performed after the second maintenance is printing on the 6001st sheet to the 7000th sheet. In the third model, billing is performed for printing overlapping with printing for the same number of sheets as the first number of printed sheets performed after the second maintenance, of printing for the same number of sheets as the second number of printed sheets performed after the third maintenance, in accordance with the second liquid consumption amount.

A liquid consumption amount set for printing on an 8001st sheet and later includes a print consumption amount and a flushing consumption amount. The liquid consumption amount set for printing on the 8001st sheet and later does not include the first maintenance consumption amount. The reason for this is that for the amount corresponding to the first maintenance consumption amount, billing is already completed when printing on the 8000th sheet.

Next, a fourth model in which, in the third model described above, timing of the third maintenance is changed is considered.

Figure 9:
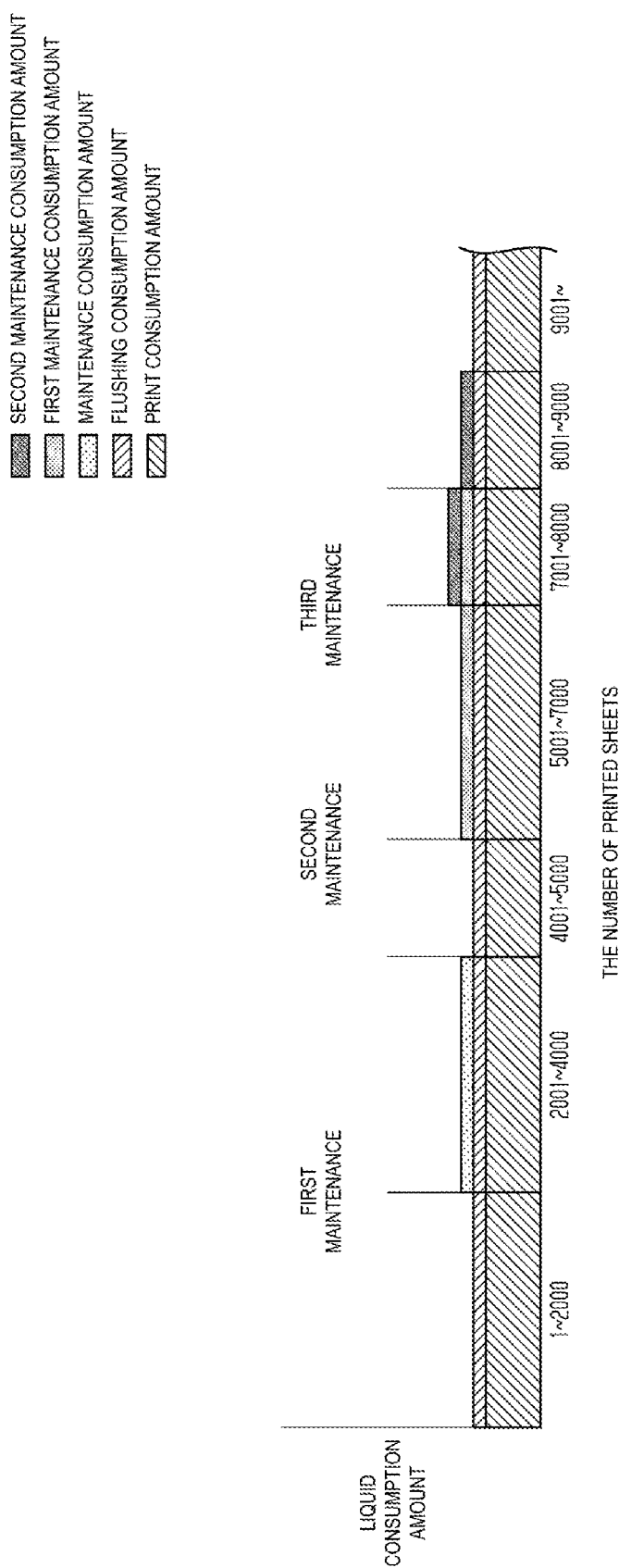
FIG. 9 is a schematic diagram illustrating a fourth model.

As illustrated in FIG. 9, in the fourth model, different from the third model, third maintenance is performed after printing on a 7000th sheet. Therefore, in the fourth model, a value of the second number of printed sheets, which is the number of printed sheets from second maintenance to the third maintenance is different, compared to the third model. In the fourth model, the second number of printed sheets is 2000.

In the fourth model, a liquid consumption amount set for printing on a 1st sheet to a 5000th sheet is similar to that in the third model.

A liquid consumption amount set for printing on a 5001st sheet to a 7000th sheet includes a print consumption amount, a flushing consumption amount, and a first maintenance consumption amount consumed in the second maintenance. In the fourth model, similar to the third model, a value obtained by adding a flushing consumption amount and a first maintenance consumption amount per unit number of sheets to a print consumption amount is referred to as a first liquid consumption amount.

A liquid consumption amount set for printing on a 7001st sheet to an 8000th sheet includes a print consumption amount, a flushing consumption amount, the first maintenance consumption amount, and a second maintenance consumption amount. That is, the liquid consumption amount set for printing on the 7001st sheet to the 8000th sheet is a value obtained by adding a second maintenance consumption amount per unit number of sheets to the first liquid consumption amount. In the fourth model, similar to the third model, the value obtained by adding the second maintenance consumption amount per unit number of sheets to the first liquid consumption amount is referred to as a second liquid consumption amount. Billing is gradually performed for an amount corresponding to the first maintenance consumption amount during printing on the 5001st sheet to the 8000th sheet.

A liquid consumption amount set for printing on an 8001st sheet to a 9000th sheet includes a print consumption amount, a flushing consumption amount, and the second maintenance consumption amount. That is, the liquid consumption amount set for printing on the 8001st sheet to the 9000th sheet does not include the first maintenance consumption amount. The reason for this is that for the amount corresponding to the first maintenance consumption amount, billing is already completed when printing on the 8000th sheet.

The liquid consumption amount set for printing on the 8001st sheet to the 9000th sheet is a value obtained by adding the second maintenance consumption amount per unit number of sheets to the print consumption amount. In the fourth model, the value obtained by adding the second maintenance consumption amount per unit number of sheets to the print consumption amount is referred to as a third liquid consumption amount. Billing is gradually performed for an amount corresponding to the second maintenance consumption amount, during printing on the 7001st sheet to the 9000th sheet.

In the fourth model, printing for the same number of sheets as the second number of printed sheets performed after the third maintenance includes printing overlapping with printing for the same number of sheets as the first number of printed sheets performed after the second maintenance, and printing not overlapping therewith. Of printing for the same number of sheets as the second number of printed sheets performed after the third maintenance, printing overlapping with printing for the same number of sheets as the first number of printed sheets performed after the second maintenance is printing on the 7001st sheet to the 8000th sheet. Of printing for the same number of sheets as the second number of printed sheets performed after the third maintenance, printing not overlapping with printing for the same number of sheets as the first number of printed sheets performed after the second maintenance is printing on the 8001st sheet to the 9000th sheet.

In the fourth model, billing is performed for printing overlapping with printing for the same number of sheets as the first number of printed sheets performed after the second maintenance, of printing for the same number of sheets as the second number of printed sheets performed after the third maintenance, in accordance with the second liquid consumption amount. In the fourth model, billing is performed for printing not overlapping with printing for the same number of sheets as the first number of printed sheets performed after the second maintenance, of printing for the same number of sheets as the second number of printed sheets performed after the third maintenance, in accordance with the third liquid consumption amount.

A liquid consumption amount set for printing on a 9001st sheet and later includes a print consumption amount and a flushing consumption amount. The liquid consumption amount set for printing on the 9001st sheet and later does not include the second maintenance consumption amount. The reason for this is that for the amount corresponding to the second maintenance consumption amount, billing is already completed when printing on the 9000th sheet.

As described in the third model and the fourth model, in the second exemplary embodiment, printing occurs that does not overlap with printing for the same number of sheets as the first number of printed sheets performed after the second maintenance, with respect to printing for the same number of sheets as the second number of printed sheets performed after the third maintenance, depending on a value of the second number of printed sheets with respect to the first number of printed sheets.

When the second number of printed sheets matches one half of the first number of printed sheets, printing does not occur that does not overlap with printing for the same number of sheets as the first number of sheets performed after the second maintenance, with respect to printing for the same number of sheets as the second number of printed sheets performed after the third maintenance. In this case, billing for an amount corresponding to the second maintenance consumption amount is completed at the same time as completion of billing for an amount corresponding to the first maintenance consumption amount.

When the second number of printed sheets is less than one half of the first number of printed sheets, printing does not occur that does not overlap with printing for the same number of sheets as the first number of sheets performed after the second maintenance, with respect to printing for the same number of sheets as the second number of printed sheets performed after the third maintenance. In this case, billing for the amount corresponding to the second maintenance consumption amount is completed before completion of billing for the amount corresponding to the first maintenance consumption amount.

When the second number of printed sheets is greater than one half of the first number of printed sheets, printing occurs that does not overlap with printing for the same number of sheets as the first number of sheets performed after the second maintenance, with respect to printing for the same number of sheets as the second number of printed sheets performed after the third maintenance. In this case, billing for the amount corresponding to the second maintenance consumption amount is completed after completion of billing for the amount corresponding to the first maintenance consumption amount.

According to the second exemplary embodiment, the following effects are obtained in addition to the effects of the first exemplary embodiment described above.

(5) Billing is performed for printing overlapping with printing for the same number of sheets as the first number of printed sheets performed after the second maintenance, of printing for the same number of sheets as the second number of printed sheets performed after the third maintenance, in accordance with the second liquid consumption amount that is a value obtained by adding the second maintenance consumption amount per unit number of sheets to the first liquid consumption amount. Billing is performed for printing not overlapping with printing for the same number of sheets as the first number of printed sheets performed after the second maintenance, of printing for the same number of sheets as the second number of printed sheets performed after the third maintenance, in accordance with the third liquid consumption amount that is a value obtained by adding the second maintenance consumption amount per unit number of sheets to the print consumption amount.

Printing for the same number of sheets as the second number of printed sheets performed after the third maintenance includes printing overlapping with printing for the same number of sheets as the first number of printed sheets performed after the second maintenance. The printing for the same number of sheets as the second number of printed sheets performed after the third maintenance, and the printing overlapping with printing for the same number of sheets as the first number of printed sheets performed after the second maintenance, are printing for the number of sheets obtained by subtracting the second number of printed sheets from the first number of printed sheets performed after the third maintenance. In this printing, billing is performed in accordance with the second liquid consumption amount. The second liquid consumption amount includes the second maintenance consumption amount per unit number of sheets, and a print consumption amount that is the first liquid consumption amount, and a maintenance consumption amount per unit number of sheets. That is, the second liquid consumption amount includes a consumed amount of the first maintenance consumption amount for which billing is not completed at the time when the third maintenance is performed, in a state of being divided per unit number of sheets. Thus, for an amount corresponding to the second maintenance consumption amount and the first maintenance consumption amount, billing is gradually performed for printing for the number of sheets obtained by subtracting the second number of printed sheets from the first number of printed sheets performed after the third maintenance.

On the other hand, printing for the same number of sheets as the second number of printed sheets performed after the third maintenance includes printing that does not overlap with printing for the same number of sheets as the first number of printed sheets performed after the second maintenance in some cases. In this printing, billing is performed in accordance with the third liquid consumption amount. The third liquid consumption amount includes the second maintenance consumption amount per unit number of sheets. Thus, with respect to the amount corresponding to the second maintenance consumption amount, billing is gradually performed for printing for the same number of sheets as the second number of printed sheets performed after the third maintenance.

As described above, for an amount corresponding to the first maintenance consumption amount, billing is performed by printing for the same number of sheets as the first number of printed sheets performed after the second maintenance. With respect to the amount corresponding to the second maintenance consumption amount, billing is performed by printing for the same number of sheets as the second number of printed sheets performed after the third maintenance. As described above, according to the second exemplary embodiment, even when maintenance is performed at a short interval, a large increase in billed amount can be suppressed.

The first exemplary embodiment and the second exemplary embodiment described above may be modified as described below. The first exemplary embodiment, the second exemplary embodiment, and the modified examples below may be implemented in combination within a range in which a technical contradiction does not arise.

A flushing consumption amount may be included in a print consumption amount. In this case, for example, the print consumption count unit 23 may count a consumed amount of liquid jetted by flushing as a print consumption amount. The liquid jetted by flushing is liquid jetted in conjunction with performing printing. Thus, it can also be said that the flushing consumption amount is a consumed amount of liquid jetted from the liquid jet head 12 for printing on a medium.

A unit value may be defined for a unit amount of a liquid consumption amount.

The control unit 15 may cause the storage unit 21 to store a liquid consumption amount set per printing for the unit number of sheets. In this case, a billed amount is calculated in accordance with accumulated liquid consumption amount. In this modified example, billing is not performed for each printing for the unit number of sheets, but is collectively performed for printing for the number of sheets accumulated.

A server electrically coupled to the liquid jet device 11 may calculate a billed amount. In this case, for example, the liquid jet device 11 transmits a quantity of each pattern to the server. The server stores a unit value corresponding to a liquid consumption amount.

The control unit 15, in distribution processing, may cause the storage unit 21 to store a distribution table in which a first maintenance consumption amount per unit number of sheets, and a first maintenance consumption amount are associated with each other. In this case, a remaining maintenance consumption amount is calculated by subtracting the first maintenance consumption amount for the unit number of sheets each time printing is performed for the unit number of sheets. Thus, in this modified example, the control unit 15, in step S26 of setting processing, subtracts the first maintenance consumption amount per unit number of sheets from the first maintenance consumption amount stored in the distribution table.

The control unit 15, in setting processing, may calculate a remaining maintenance consumption amount, by multiplying a difference number of sheets, that is a value obtained by subtracting the second number of printed sheets from the first number of printed sheets, and a first maintenance consumption amount per unit number of sheets together.

The control unit 15, in redistribution processing, after calculating a total maintenance consumption amount by adding a remaining maintenance consumption amount and a maintenance consumption amount together, may calculate a total maintenance amount per unit number of sheets.

The control unit 15, in redistribution processing, may cause the storage unit 21 to store a distribution table in which, a remaining maintenance consumption per unit number of sheets, and a maintenance consumption amount per unit number of sheets, rather than a total maintenance consumption amount, are stored individually.

Distribution processing, setting processing, billing processing, redistribution processing, and the like, may be performed by the control unit 15 reading a program stored in a storage medium such as a CD, a USB memory, or the like.

Liquid jetted by the liquid jet head 12 is not limited to ink, and may be, for example, a liquid material in which particles of a functional material are dispersed or mixed in a liquid. For example, the liquid jet head 12 may jet a liquid material including a material such as an electrode material or a pixel material used in manufacture of a liquid crystal display, an electroluminescent (EL) display, and a surface emitting display in a dispersed or dissolved form.

Hereinafter, technical concepts and effects thereof that are understood from the above-described exemplary embodiments and modified examples will be described.

(A) A billing method for a liquid jet device includes, counting a consumed amount of liquid jetted from a liquid jet head for printing on a medium, counting the number of sheets of the medium on which printing was performed, counting a consumed amount of liquid forcibly discharged from the liquid jet head for maintenance of the liquid jet head, calculating a maintenance consumption amount per unit number of sheets from a maintenance consumption amount that is a consumed amount of liquid consumed in current maintenance, and the number of printed sheets that is the number of sheets of the medium on which printing was performed from previous maintenance to the current maintenance, setting, as a liquid consumption amount, a value obtained by adding the maintenance consumption amount per unit number of sheets, to a print consumption amount that is a consumed amount of liquid consumed in printing for the unit number of sheets, and performing billing for printing on the same number of sheets as the number of printed sheets performed after the current maintenance, in accordance with the liquid consumption amount.

The liquid consumption amount includes the maintenance consumption amount, which is the consumed amount of liquid consumed in the current maintenance, in a state of being divided per unit number of sheets. That is, with respect to an amount corresponding to the maintenance consumption amount, billing is gradually performed for printing for the same number of sheets as the number of printed sheets performed after the current maintenance. Therefore, according to the above method, compared to a case where billing is immediately performed for the amount corresponding to the maintenance consumption amount, a large increase in billed amount by performing maintenance is suppressed.

(B) The above-described billing method for liquid jet device may include, when the number of printed sheets is the first number of printed sheets, the maintenance consumption amount is a first maintenance consumption amount, the liquid consumption amount is a first liquid consumption amount, the previous maintenance is first maintenance, the current maintenance is second maintenance, the maintenance performed after the second maintenance is third maintenance, and the third maintenance is performed after the second maintenance is performed and before printing is completed for the same number of sheets as the first number of printed sheets, calculating, from a second maintenance consumption amount that is a consumed amount of liquid consumed in the third maintenance, and the second number of printed sheets that is the number of sheets of the medium on which printing was performed from the second maintenance to the third maintenance, the second maintenance consumption amount per unit number of sheets, calculating, from a remaining maintenance consumption amount of the first maintenance consumption amount that is an amount for which billing is not completed, and the second number of printed sheets, the remaining maintenance consumption amount per unit number of sheets, setting as a second liquid consumption amount, a value obtained by adding the second maintenance consumption amount per unit number of sheets and the remaining maintenance consumption amount per unit number of sheets to the print consumption amount, and billing for printing for the same number of sheets as the second number of printed sheets performed after the third maintenance, in accordance with the second liquid consumption amount.

The second liquid consumption amount includes a second maintenance consumption amount, which is a consumed amount of liquid consumed in the third maintenance, in a state of being divided per unit number of sheets. That is, with respect to an amount corresponding to the second maintenance consumption amount, billing is gradually performed for printing for the same number of sheets as the second number of printed sheets performed after the third maintenance. Further, the second liquid consumption amount includes a remaining maintenance consumption amount of the first maintenance consumption amount, for which billing is not completed, in a state of being divided per unit number of sheets. In other words, with respect to an amount corresponding to the remaining maintenance consumption amount, billing is gradually performed for printing for the same number of sheets as the second number of printed sheets performed after the third maintenance. Therefore, according to the above method, even when maintenance is performed at a short interval, a large increase in billed amount is suppressed.

(C) The above-described billing method for liquid jet device may include, when the number of printed sheets is the first number of printed sheets, the maintenance consumption amount is a first maintenance consumption amount, the liquid consumption amount is a first liquid consumption amount, the previous maintenance is first maintenance, the current maintenance is second maintenance, the maintenance performed after the second maintenance is third maintenance, and the third maintenance is performed after the second maintenance is performed and before printing is completed for the same number of sheets as the first number of printed sheets, calculating, from a second maintenance consumption amount that is a consumed amount of liquid consumed in the third maintenance, and the second number of printed sheets that is the number of sheets of the medium on which printing was performed from the second maintenance to the third maintenance, the second maintenance consumption amount per unit number of sheets, of printing for the same number of sheets as the second number of printed sheets performed after the third maintenance, billing for printing overlapping with printing for the same number of sheets as the first number of printed sheets performed after the second maintenance, in accordance with a second liquid consumption amount that is a value obtained by adding the second maintenance consumption amount per unit number of sheets to the first liquid consumption amount, and billing for printing not overlapping with printing for the same number of sheets as the first number of printed sheets performed after the second maintenance, in accordance with a third liquid consumption amount that is a value obtained by adding the second maintenance consumption amount per unit number of sheets to the print consumption amount.

Printing for the same number of sheets as the second number of printed sheets performed after the third maintenance includes printing overlapping with printing for the same number of sheets as the first number of printed sheets performed after the second maintenance. The printing for the same number of sheets as the second number of printed sheets performed after the third maintenance, and the printing overlapping with printing for the same number of sheets as the first number of printed sheets performed after the second maintenance, are printing for the number of sheets obtained by subtracting the second number of printed sheets from the first number of printed sheets performed after the third maintenance. In this printing, billing is performed in accordance with the second liquid consumption amount. The second liquid consumption amount includes the second maintenance consumption amount per unit number of sheets, and the print consumption amount that is the first liquid consumption amount, and the first maintenance consumption amount per unit number of sheets. Thus, for an amount corresponding to the second maintenance consumption amount and the first maintenance consumption amount, billing is gradually performed for printing for the number of sheets obtained by subtracting the second number of sheets from the first number of printed sheets performed after the third maintenance.

On the other hand, printing for the same number of sheets as the second number of printed sheets performed after the third maintenance includes printing that does not overlap with printing for the same number of sheets as the first number of printed sheets performed after the second maintenance in some cases. In this printing, billing is performed in accordance with the third liquid consumption amount. The third liquid consumption amount includes the print consumption amount and the second maintenance consumption amount per unit number of sheets. Thus, with respect to the amount corresponding to the second maintenance consumption amount, billing is gradually performed for printing for the same number of sheets as the second number of printed sheets performed after the third maintenance.

As described above, for an amount corresponding to the first maintenance consumption amount, billing is performed by printing for the same number of sheets as the first number of printed sheets performed after the second maintenance. With respect to the amount corresponding to the second maintenance consumption amount, billing is performed by printing for the same number of sheets as the second number of printed sheets performed after the third maintenance. As described above, according to the above method, even when maintenance is performed at a short interval, a large increase in billed amount can be suppressed.

(D) The above-described billing method for liquid jet device may include determining a billed amount to be billed for printing, in accordance with a percentage of the liquid consumption amount based on the maximum print consumption amount that is the maximum consumption amount of liquid consumed in printing for the unit number of sheets.

According to the method described above, billing can be appropriately performed in accordance with the percentage of the liquid consumption amount.

(E) In the above-described billing method for liquid jet device, the billed amount may be divided into three stages in accordance with the percentage.

According to the above-described method, the billed amount can be set comprehensibly for the user.

(F) A liquid jet device includes, a liquid jet head configured to jet liquid on a medium for printing on the medium, a maintenance mechanism configured to forcibly cause liquid to be discharged from the liquid jet head to maintain the liquid jet head, and a control unit, wherein the control unit counts a consumed amount of liquid jetted from the liquid jet head for printing on the medium, counts the number of sheets of the medium on which printing was performed, counts a consumed amount of liquid forcibly discharged from the liquid jet head, for maintenance of the liquid jet head, calculates a maintenance consumption amount per unit number of sheets, from a maintenance consumption amount that is a consumed amount of liquid consumed in current maintenance, and the number of printed sheets that is the number of sheets of the medium on which printing was performed from previous maintenance to the current maintenance, sets as a liquid consumption amount, a value obtained by adding the maintenance consumption amount per unit number of sheets, to a print consumption amount that is a consumed amount of liquid consumed in printing for the unit number of sheets, and performs billing for printing for the same number of sheets as the number of printed sheets performed after the current maintenance, in accordance with the liquid consumption amount.

According to the above-described configuration, the same effects as the above-described billing method can be obtained.

(G) In the above-described liquid jet device, when the number of printed sheets is the first number of printed sheets, the maintenance consumption amount is a first maintenance consumption amount, the liquid consumption amount is a first liquid consumption amount, the previous maintenance is first maintenance, the current maintenance is second maintenance, the maintenance performed after the second maintenance is third maintenance, and the third maintenance is performed after the second maintenance is performed and before printing is completed for the same number of sheets as the first number of printed sheets, the control unit may calculate, from a second maintenance consumption amount that is a consumed amount of liquid consumed in the third maintenance, and the second number of printed sheets that is the number of sheets of the medium on which printing was performed from the second maintenance to the third maintenance, the second maintenance consumption amount per unit number of sheets, may calculate, from a remaining maintenance consumption amount of the first maintenance consumption amount that is an amount for which billing is not completed, and the second number of printed sheets, the remaining maintenance consumption amount per unit number of sheets, may set as a second liquid consumption amount, a value obtained by adding the second maintenance consumption amount per unit number of sheets and the remaining maintenance consumption amount per unit number of sheets to the print consumption amount, and may bill for printing for the same number of sheets as the second number of printed sheets performed after the third maintenance, in accordance with the second liquid consumption amount.

According to the above-described configuration, similar effects to the above-described billing method can be obtained.

(H) The above-described liquid jet device, when the number of printed sheets is the first number of printed sheets, the maintenance consumption amount is a first maintenance consumption amount, the liquid consumption amount is a first liquid consumption amount, the previous maintenance is first maintenance, the current maintenance is second maintenance, the maintenance performed after the second maintenance is third maintenance, and the third maintenance is performed after the second maintenance is performed and before printing is completed for the same number of sheets as the first number of printed sheets, from a second maintenance consumption amount that is a consumed amount of liquid consumed in the third maintenance, and the second number of printed sheets that is the number of sheets of the medium on which printing was performed from the second maintenance to the third maintenance, the second maintenance consumption amount per unit number of sheets may be calculated, of printing for the same number of sheets as the second number of printed sheets performed after the third maintenance, billing may be performed for printing overlapping with printing for the same number of sheets as the first number of printed sheets performed after the second maintenance, in accordance with a second liquid consumption amount that is a value obtained by adding the second maintenance consumption amount per unit number of sheets to the first liquid consumption amount, and billing may be performed for printing not overlapping with printing for the same number of sheets as the first number of printed sheets performed after the second maintenance, in accordance with a third liquid consumption amount that is a value obtained by adding the second maintenance consumption amount per unit number of sheets to the print consumption amount.

According to the above-described configuration, similar effects to the above-described billing method can be obtained.

(I) In the liquid jet device described above, the control unit may determine a billed amount to be billed for printing, in accordance with a percentage of the liquid consumption amount based on the maximum print consumption amount that is the maximum consumption amount of liquid consumed in printing for the unit number of sheets.

According to the above-described configuration, similar effects to the above-described billing method can be obtained.

What is claimed is:

1. A billing method for a liquid jet device, comprising:
    counting a consumed amount of liquid jetted from a liquid jet head for printing on a medium;
    counting a number of sheets of the medium on which the printing was performed;
    counting a consumed amount of liquid forcibly discharged from the liquid jet head for maintenance of the liquid jet head;
    calculating a first maintenance consumption amount per unit number of sheets, wherein the calculation of the first maintenance consumption amount is based on a first maintenance consumption amount that is a consumed amount of liquid consumed in a second maintenance, and a first number of printed sheets that is the number of sheets of the medium on which the printing was performed from a first maintenance to the second maintenance;
    setting, as a first liquid consumption amount, a value obtained by adding the first maintenance consumption amount per unit number of sheets, to a print consumption amount that is a consumed amount of liquid consumed in printing for the unit number of sheets; and
    performing billing for printing performed in accordance with the first liquid consumption amount until printing is completed for the same number of sheets as the first number of printed sheets after the second maintenance.

2. The billing method for liquid jet device according to claim 1, comprising:
    the maintenance performed after the second maintenance is third maintenance, and
    the third maintenance is performed after the second maintenance is performed and before printing is completed for the same number of sheets as the first number of printed sheets,
    calculating, from a second maintenance consumption amount that is a consumed amount of liquid consumed in the third maintenance and a second number of printed sheets that is the number of sheets of the medium on which printing was performed from the second maintenance to the third maintenance, the second maintenance consumption amount per unit number of sheets;
    calculating, from a remaining maintenance consumption amount of the first maintenance consumption amount that is an amount for which billing is not completed and the second number of printed sheets, the remaining maintenance consumption amount per unit number of sheets;
    setting, as a second liquid consumption amount, a value obtained by adding the second maintenance consumption amount per unit number of sheets and the remaining maintenance consumption amount per unit number of sheets to the print consumption amount; and
    performing billing for printing for the same number of sheets as the second number of printed sheets performed after the third maintenance, in accordance with the second liquid consumption amount.

3. The billing method for liquid jet device according to claim 1, comprising:
    the maintenance performed after the second maintenance is third maintenance, and
    the third maintenance is performed after the second maintenance is performed and before printing is completed for the same number of sheets as the first number of printed sheets,
    calculating, from a second maintenance consumption amount that is a consumed amount of liquid consumed in the third maintenance, and a second number of printed sheets that is the number of sheets of the medium on which printing was performed from the second maintenance to the third maintenance, the second maintenance consumption amount per unit number of sheets;
    performing billing in accordance with a second liquid consumption amount that is a value obtained by adding the second maintenance consumption amount per unit number of sheets to the first liquid consumption amount, for printing overlapping with printing for the same number of sheets as the first number of printed sheets performed after the second maintenance; and
    performing billing in accordance with a third liquid consumption amount that is a value obtained by adding the second maintenance consumption amount per unit number of sheets to the print consumption amount, for printing not overlapping with printing for the same number of sheets as the first number of printed sheets performed after the second maintenance, of printing for the same number of sheets as the second number of printed sheets performed after the third maintenance.

4. The billing method for liquid jet device according to claim 1, comprising;
    determining a billed amount to be billed for printing, in accordance with a percentage of the liquid consumption amount based on a maximum print consumption amount that is a maximum consumption amount of liquid consumed in printing for the unit number of sheets.

5. The billing method for liquid jet device according to claim 4, wherein the billed amount is divided into three stages in accordance with the percentage.

6. A liquid jet device, comprising:
    a liquid jet head configured to jet liquid on a medium for printing on the medium;
    a pump configured to forcibly cause liquid to be discharged from the liquid jet head to maintain the liquid jet head; and
    a controller configured to control the liquid jet head and the pump, wherein the controller
        counts a consumed amount of liquid jetted from the liquid jet head for printing on the medium,
        counts a number of sheets of the medium on which the printing was performed,
        counts a consumed amount of liquid forcibly discharged from the liquid jet head, for maintenance of the liquid jet head,
        calculates a first maintenance consumption amount per unit number of sheets, wherein the calculation of the first maintenance consumption amount is based on a first maintenance consumption amount that is a consumed amount of liquid consumed in a second maintenance, and a first number of printed sheets that is the number of sheets of the medium on which the printing was performed from a first maintenance to the second maintenance, sets, as a first liquid consumption amount, a value obtained by adding the first maintenance consumption amount per unit number of sheets, to a print consumption amount that is a consumed amount of liquid consumed in printing for the unit number of sheets, and performs billing for printing performed in accordance with the first liquid consumption amount until printing is completed for the same number of sheets as the first number of printed sheets after the second maintenance.

7. The liquid jet device according to claim 6, wherein
the maintenance performed after the second maintenance is third maintenance, and
the third maintenance is performed after the second maintenance is performed and before printing is completed for the same number of sheets as the first number of printed sheets,
the controller
calculates, from a second maintenance consumption amount that is a consumed amount of liquid consumed in the third maintenance, and a second number of printed sheets that is the number of sheets of the medium on which printing was performed from the second maintenance to the third maintenance, the second maintenance consumption amount per unit number of sheets,
calculates, from a remaining maintenance consumption amount of the first maintenance consumption amount that is an amount for which billing is not completed, and the second number of printed sheets, the remaining maintenance consumption amount per unit number of sheets,
sets, as a second liquid consumption amount, a value obtained by adding the second maintenance consumption amount per unit number of sheets and the remaining maintenance consumption amount per unit number of sheets, to the print consumption amount, and
performs billing for printing for the same number of sheets as the second number of printed sheets performed after the third maintenance, in accordance with the second liquid consumption amount.

8. The liquid jet device according to claim 6, wherein
the maintenance performed after the second maintenance is third maintenance, and
the third maintenance is performed after the second maintenance is performed and before printing is completed for the same number of sheets as the first number of printed sheets,
the controller
calculates, from a second maintenance consumption amount that is a consumed amount of liquid consumed in the third maintenance, and a second number of printed sheets that is the number of sheets of the medium on which printing was performed from the second maintenance to the third maintenance, the second maintenance consumption amount per unit number of sheets,
performs billing in accordance with a second liquid consumption amount that is a value obtained by adding the second maintenance consumption amount per unit number of sheets to the first liquid consumption amount, for printing overlapping with printing for the same number of sheets as the first number of printed sheets performed after the second maintenance, and performs billing in accordance with a third liquid consumption amount that is a value obtained by adding the second maintenance consumption amount per unit number of sheets to the print consumption amount, for printing not overlapping with printing for the same number of sheets as the first number of printed sheets performed after the second maintenance, of printing for the same number of sheets as the second number of printed sheets performed after the third maintenance.

9. The liquid jet device according to claim 6, wherein
the controller determines a billed amount to be billed for printing, in accordance with a percentage of the liquid consumption amount based on a maximum print consumption amount that is a maximum consumption amount of liquid consumed in printing for the unit number of sheets.

10. A billing method for a liquid jet device, comprising:
counting a consumed amount of liquid jetted from a liquid jet head for printing on a medium;
counting a number of sheets of the medium on which the printing was performed;
counting a consumed amount of liquid forcibly discharged from the liquid jet head for maintenance of the liquid jet head;
calculating a first maintenance consumption amount per unit number of sheets, from a maintenance consumption amount that is a consumed amount of liquid consumed in a second maintenance, and a first number of printed sheets that is the number of sheets of the medium on which the printing was performed from a first maintenance to the second maintenance, wherein
a third maintenance is performed after the second maintenance is performed and before printing is completed for the same number of sheets as the first number of printed sheets;
calculating, from a second maintenance consumption amount that is a consumed amount of liquid consumed in the third maintenance and a second number of printed sheets that is the number of sheets of the medium on which the printing was performed from the second maintenance to the third maintenance, the second maintenance consumption amount per unit number of sheets;
calculating, from a remaining maintenance consumption amount of the first maintenance consumption amount that is an amount for which billing is not completed and the second number of printed sheets, a remaining maintenance consumption amount per unit number of sheets;
setting, as a first liquid consumption amount, a value obtained by adding the first maintenance consumption amount per unit number of sheets, to a print consumption amount that is a consumed amount of liquid consumed in printing for the unit number of sheets;
setting, as a second liquid consumption amount, a value obtained by adding the second maintenance consumption amount per unit number of sheets and the remaining maintenance consumption amount per unit number of sheets to the print consumption amount;
performing billing for printing on the same number of sheets as the first number of printed sheets performed after the second maintenance, in accordance with the first liquid consumption amount; and
performing billing for printing for the same number of sheets as the second number of printed sheets performed after the third maintenance, in accordance with the second liquid consumption amount.

\* \* \* \* \*